United States Patent
Mirbagheri et al.

(10) Patent No.: US 10,439,775 B2
(45) Date of Patent: Oct. 8, 2019

(54) RANDOMIZATION OF PRS FREQUENCY OFFSETS AND MUTING PATTERNS IN LTE FOR EOTDOA

(71) Applicant: QUALCOMM Incorporated, San Diego, CA (US)

(72) Inventors: Arash Mirbagheri, San Diego, CA (US); Brian Clarke Banister, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 620 days.

(21) Appl. No.: 14/842,387

(22) Filed: Sep. 1, 2015

(65) Prior Publication Data

US 2016/0065342 A1 Mar. 3, 2016

Related U.S. Application Data

(60) Provisional application No. 62/044,765, filed on Sep. 2, 2014.

(51) Int. Cl.
*H04L 5/00* (2006.01)
*H04W 64/00* (2009.01)
(Continued)

(52) U.S. Cl.
CPC .......... *H04L 5/0048* (2013.01); *H04L 5/0007* (2013.01); *H04W 64/00* (2013.01);
(Continued)

(58) Field of Classification Search
CPC .................................................... H04L 5/0048
See application file for complete search history.

(56) References Cited

U.S. PATENT DOCUMENTS

| 5,930,291 A * | 7/1999 | Hines | G06F 7/582 |
| | | | 331/78 |
| 2005/0099321 A1* | 5/2005 | Pearce | G08G 1/123 |
| | | | 340/995.13 |

(Continued)

FOREIGN PATENT DOCUMENTS

| JP | 2012523183 A | 9/2012 |
| JP | 2013536616 A | 9/2013 |
| WO | 2010087214 A1 | 8/2010 |

OTHER PUBLICATIONS

International Search Report and Written Opinion—PCT/US2015/048115—ISA/EPO—dated Nov. 20, 2015.

*Primary Examiner* — Kevin M Cunningham
(74) *Attorney, Agent, or Firm* — Patterson & Sheridan, L.L.P.

(57) ABSTRACT

Certain aspects of the present disclosure generally relate to randomization of positioning reference signal (PRS) frequency offsets and muting patterns in long term evolution (LTE) for enhanced observed time difference of arrival (eOTDOA). According to certain aspects, a method is provided for wireless communications which may be performed, for example, by a base station (BS). The method generally includes randomly selecting at least one parameter used to determine a set of time-frequency resources for transmitting positioning reference signals (PRS) and transmitting PRS on the determined set of time-frequency resources. The user equipment (UE) may randomly select the at least one parameter used to determine the set of time-frequency resources to measure for the PRS from the BS and measure PRS on the determined set of time-frequency resources.

18 Claims, 10 Drawing Sheets

(51) Int. Cl.
*H04W 72/02* (2009.01)
*H04W 28/18* (2009.01)
*H04W 72/00* (2009.01)

(52) U.S. Cl.
CPC ............ *H04W 72/02* (2013.01); *H04W 28/18* (2013.01); *H04W 72/005* (2013.01)

(56) References Cited

U.S. PATENT DOCUMENTS

| | | | |
|---|---|---|---|
| 2006/0137027 A1* | 6/2006 | Rogers | G06F 21/10 726/29 |
| 2010/0172311 A1* | 7/2010 | Agrawal | H04L 5/0048 370/329 |
| 2010/0189032 A1* | 7/2010 | Chen | H04B 1/7143 370/328 |
| 2012/0044796 A1* | 2/2012 | Yoon | G01S 1/042 370/208 |
| 2012/0046030 A1* | 2/2012 | Siomina | G01S 5/00 455/423 |
| 2017/0289953 A1* | 10/2017 | Chae | G01S 1/02 |

* cited by examiner

RANDOMIZATION OF PRS FREQUENCY OFFSETS AND MUTING PATTERNS IN LTE FOR EOTDOA

CROSS-REFERENCE TO RELATED APPLICATIONS

This application claims benefit of U.S. Provisional Patent Application Ser. No. 62/044,765, filed Sep. 2, 2014, which is incorporated by reference in its entirety herein.

FIELD OF THE DISCLOSURE

Certain aspects of the present disclosure relate generally to wireless communication systems, and more specifically, to randomization of positioning reference signal (PRS) frequency offsets and muting patterns in long term evolution (LTE) for enhanced observed time difference of arrival (eOTDOA).

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division— Code Division Multiple Access (TD-CDMA), and Time Division—Synchronous Code Division Multiple Access (TD-SCDMA). For example, China is pursuing TD-SCDMA as the underlying air interface in the UTRAN architecture with its existing GSM infrastructure as the core network. UMTS also supports enhanced 3G data communications protocols, such as High Speed Downlink Packet Data (HSDPA), which provides higher data transfer speeds and capacity to associated UMTS networks.

In addition to operation in wireless telecommunication systems in which wireless service is afforded through disparate base stations, a UE can consume data related to various services such as location-based services. Based on technology or provisioning settings (e.g., enabled functionality) of the UE, position of the UE can be estimated at least in part by the UE through data received from a plurality of satellites, or from control signaling received from a plurality of base stations. In 3GPP LTE networks, such control signaling data includes positioning reference signal (PRS), which is transmitted by the plurality of base stations and received by the UE. In conventional telecommunication systems, decoding of PRS sequences of reference symbols at the receiver generally results in secondary correlation peaks. Such secondary correlation peaks can affect determination of time-of-flight intervals that are part of process(es) (e.g., trilateration, triangulation, etc.) to produce an estimate of location of the UE.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and user terminals in a wireless network.

Certain aspects of the present disclosure generally relate to randomization of positioning reference signal (PRS) frequency offsets and muting patterns in long term evolution (LTE) for enhanced observed time difference of arrival (eOTDOA).

According to certain aspects, a method for wireless communications by a base station (BS) is provided. The method generally includes randomly selecting at least one parameter used to determine a set of time-frequency resources for transmitting PRS, determining the set of time-frequency resources based at least on the at least one parameter, and transmitting PRS on the determined set of time-frequency resources.

According to certain aspects, a method for wireless communications by a user equipment (UE) is provided. The method generally includes randomly selecting at least one parameter used to determine a set of time-frequency resources to measure for PRS from a BS and measuring PRS on the set of time-frequency resources.

According to certain aspects, an apparatus for wireless communications is provided. The apparatus generally includes means for randomly selecting at least one parameter used to determine a set of time-frequency resources for transmitting PRS, means for determining the set of time-frequency resources based at least on the at least one parameter, and means for transmitting PRS on the determined set of time-frequency resources.

According to certain aspects, an apparatus for wireless communications is provided. The apparatus generally includes means for randomly selecting at least one parameter used to determine a set of time-frequency resources to measure for PRS from a BS and means for measuring PRS on the set of time-frequency resources.

According to certain aspects, an apparatus for wireless communications is provided. The apparatus generally includes: at least one processor configured to: randomly select at least one parameter used to determine a set of time-frequency resources for transmitting PRS, determine the set of time-frequency resources based at least on the at least one parameter, and transmit PRS on the determined set of time-frequency resources; and a memory coupled with the at least one processor.

According to certain aspects, an apparatus for wireless communications is provided. The apparatus generally includes at least one processor configured to: randomly select at least one parameter used to determine a set of time-frequency resources to measure for PRS from a BS and measure PRS on the set of time-frequency resources; and a memory coupled with the at least one processor.

According to certain aspects, a computer readable medium is provided. The computer readable medium generally includes computer executable code stored thereon, the computer executable code comprising: code to randomly select at least one parameter used to determine a set of time-frequency resources for transmitting PRS, code to determine the set of time-frequency resources based at least on the at least one parameter, and code to transmit PRS on the determined set of time-frequency resources.

According to certain aspects, a computer readable medium is provided. The computer readable medium generally includes computer executable code stored thereon, the computer executable code comprising: code to randomly select at least one parameter used to determine a set of time-frequency resources to measure for PRS from a BS and code to measure PRS on the set of time-frequency resources.

Certain aspects of the present disclosure generally relate to randomization of positioning reference signal (PRS) frequency offsets and muting patterns in long term evolution (LTE) for enhanced observed time difference of arrival (eOTDOA).

According to certain aspects, an access point (AP) is provided. The AP generally includes a processing system configured to randomly select at least one parameter used to determine a set of time-frequency resources for transmitting PRS and a transmitter configured to transmit PRS on the determined set of time-frequency resources.

According to certain aspects, an access terminal is provided. The access terminal generally includes a processing system configured to randomly select at least one parameter used to determine a set of time-frequency resources to measure for PRS from a BS and measure PRS on the determined set of time-frequency resources.

Numerous other aspects are provided including apparatus, systems and computer program products. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Certain aspects of the present disclosure generally relate to randomization of positioning reference signal (PRS) frequency offsets and muting patterns in long term evolution (LTE) enhanced observed time difference of arrival (eOTDOA). For example, a random number generator may be used to generate a frequency tone offset for PRS in a subframe or to generate muting sequences. A seed for the generator can be known at both the base station (BS) and the user equipment (UE). This may increase hearability, thus allowing the UE to measure PRS from more neighboring BSs and improve the accuracy of OTDOA estimations.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An Orthogonal Frequency Division Multiple Access (OFDMA) network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). LTE generally refers to both LTE and LTE-A. The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
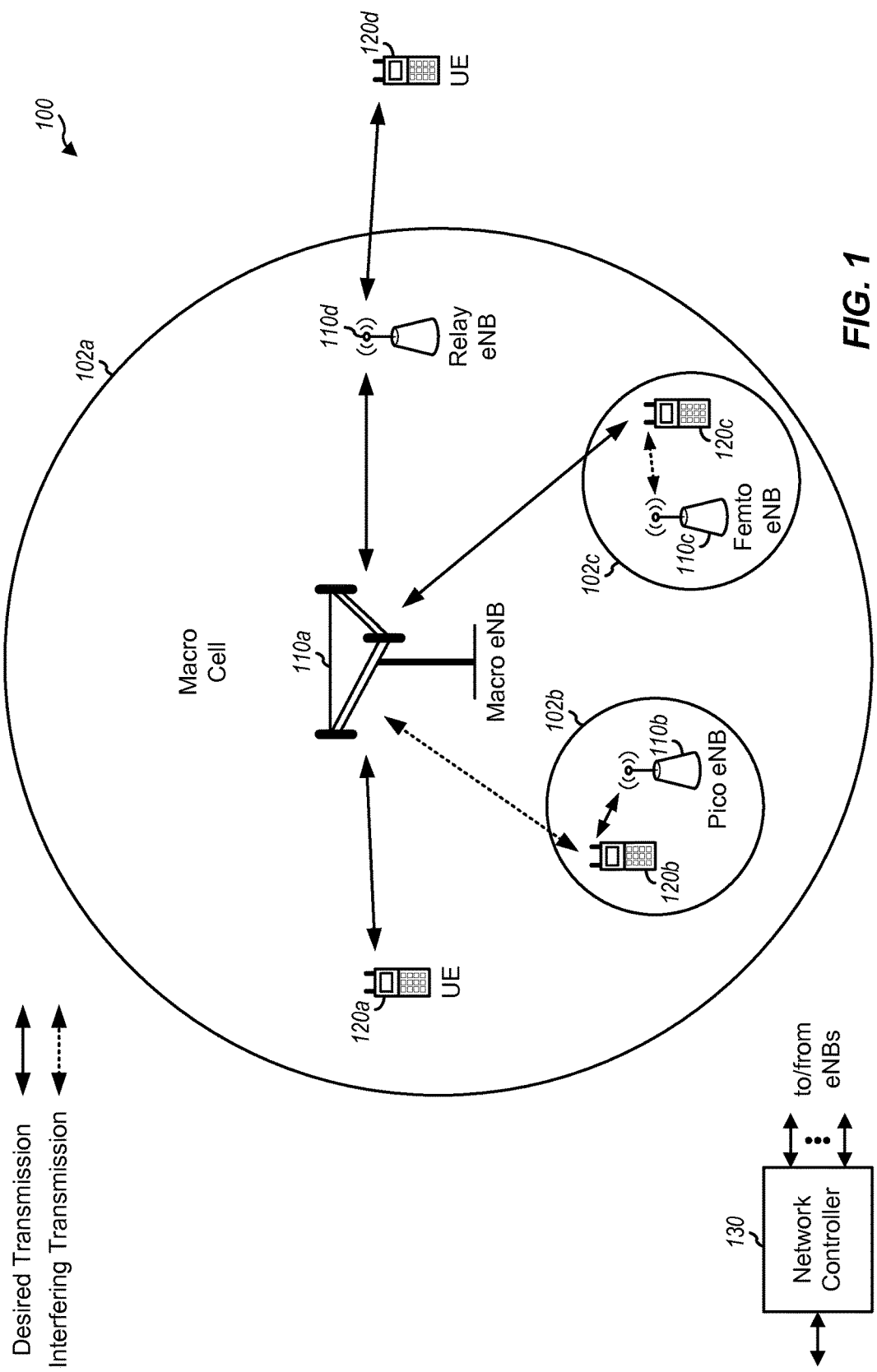
FIG. 1 is a block diagram conceptually illustrating an example of a telecommunications system, in accordance with certain aspects of the present disclosure.

FIG. 1 shows a wireless communication network 100, in which aspects of the present disclosure may be performed.

For example, the eNB 110 may randomly select at least one parameter (e.g., frequency tone offset or muting pattern) used to determine a set of time-frequency resources for transmitting positioning reference signals (PRS). The eNB 110 may transmit PRS, for example, to UE 120 on the determined set of time-frequency resources. The UE 120 may use a corresponding random number generator and seed, for example, to randomly select the parameter(s) to determine the set of time-frequency resources to measure for the PRS form the BS.

The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a user terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smartbook, an ultrabook, a wearable device (e.g., smart glasses, smart watch, smart wrist band, smart ring, smart bracelet, smart clothing), a drone, a robot, a meter, a monitor, a sensor, and etc.

Figure 2:
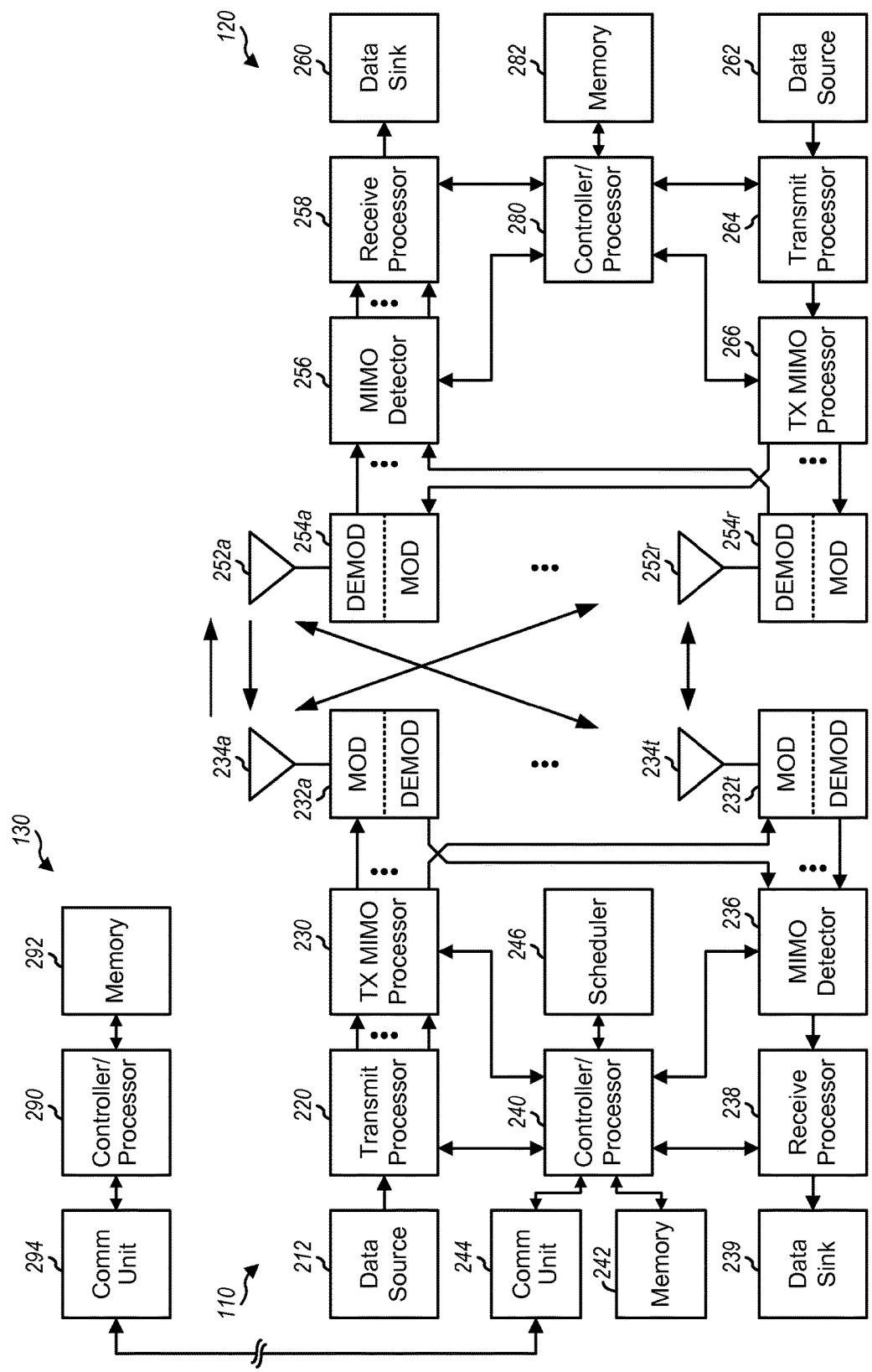
FIG. 2 is a block diagram conceptually illustrating an example of a Node B in communication with a user equipment (UE) in a telecommunications system, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r.

At base station 110, a transmit processor 220 may receive data from a data source 212 for one or more UEs, select one or more modulation and coding schemes (MCS) for each UE based on channel quality information (CQIs) received from the UE, process (e.g., encode and modulate) the data for each UE based on the modulation and coding scheme selected for the UE, and provide data symbols for all UEs. Transmit processor 220 may also process system information and control information (e.g., CQI requests, grants, upper layer signaling, etc.) and provide overhead symbols and control symbols. Processor 220 may also generate reference symbols for reference signals (e.g., the cell-specific reference signals) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280.

On the uplink, at UE 120, a transmit processor 264 may receive and process data from a data source 262 and control information from controller/processor 280. Processor 264 may also generate reference symbols for one or more reference signals. The symbols from transmit processor 264 may be precoded by a TX MIMO processor 266 if applicable, further processed by modulators 254a through 254r (e.g., for single-carrier frequency division multiplexing (SC-FDM), orthogonal frequency division multiplexing (OFDM), etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 280 and/or other processors and modules at UE 120 may perform or direct operations for configuring a UE to unambiguously detect the time of arrival of a cell based on positioning reference signals (PRS), as described herein. For example, controller/processor 280 and/or other processors and modules at UE 120 may perform or direct operations for various procedures, such as those illustrated in connection with FIG. 7. Memory 282 may store data and program codes for UE 120. For example, controller/processor 240 and/or other processors and modules at base station 110 may perform or direct operations for various procedures, such as those illustrated in connection with FIG. 6. Memory 242 may store data and program codes for base station 110. A scheduler 244 may schedule UEs for data transmission on the downlink and/or uplink. Network controller 130 may include, for example, memory 292, controller/processor 290, and communications unit 294.

Figure 3:
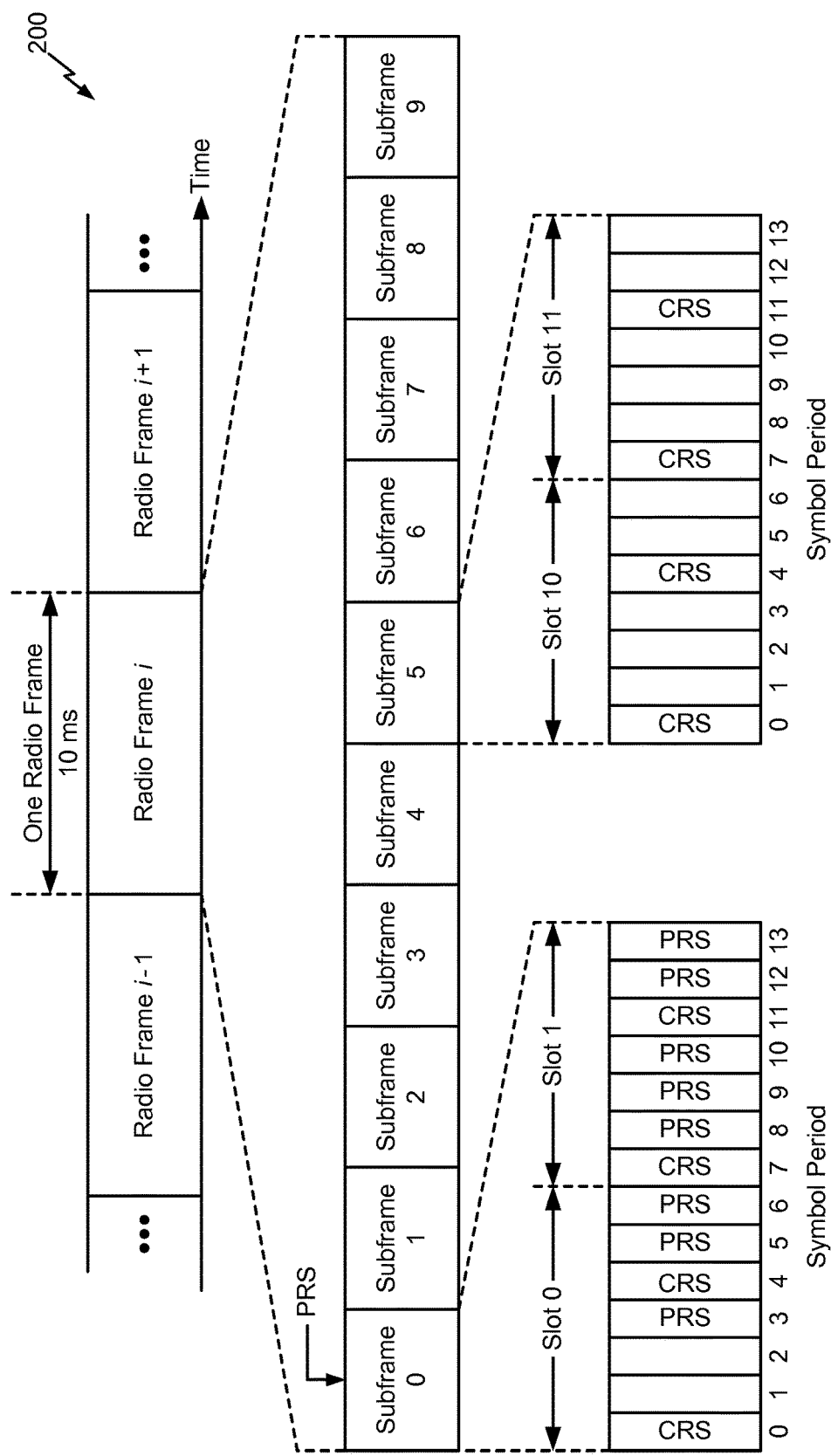
FIG. 3 illustrates an example frame structure, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix or six symbol periods for an extended cyclic prefix. The 2 L symbol periods in each subframe may be assigned indices of 0 through 2L−1.

LTE utilizes OFDM on the downlink and SC-FDM on the uplink. OFDM and SC-FDM partition a frequency range into multiple ($N_{FFT}$) orthogonal subcarriers, which are also commonly referred to as frequency tones, tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.4, 3, 5, 10 or 20 megahertz (MHz), respectively.

The time-frequency resources available for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

FIG. 3 shows transmission of reference signals in LTE, according to aspects of the present disclosure. A cell may transmit a cell-specific reference signal (CRS) in certain symbol periods of each subframe. The cell may transmit a positioning reference signal (PRS) in certain symbol periods of certain subframes. The CRS and PRS may be specific for the cell and may be generated based on a cell identity (ID) of the cell. The CRS and PRS may be used for various purposes such as channel estimation, channel measurement, channel feedback reporting, etc.

Figure 4:
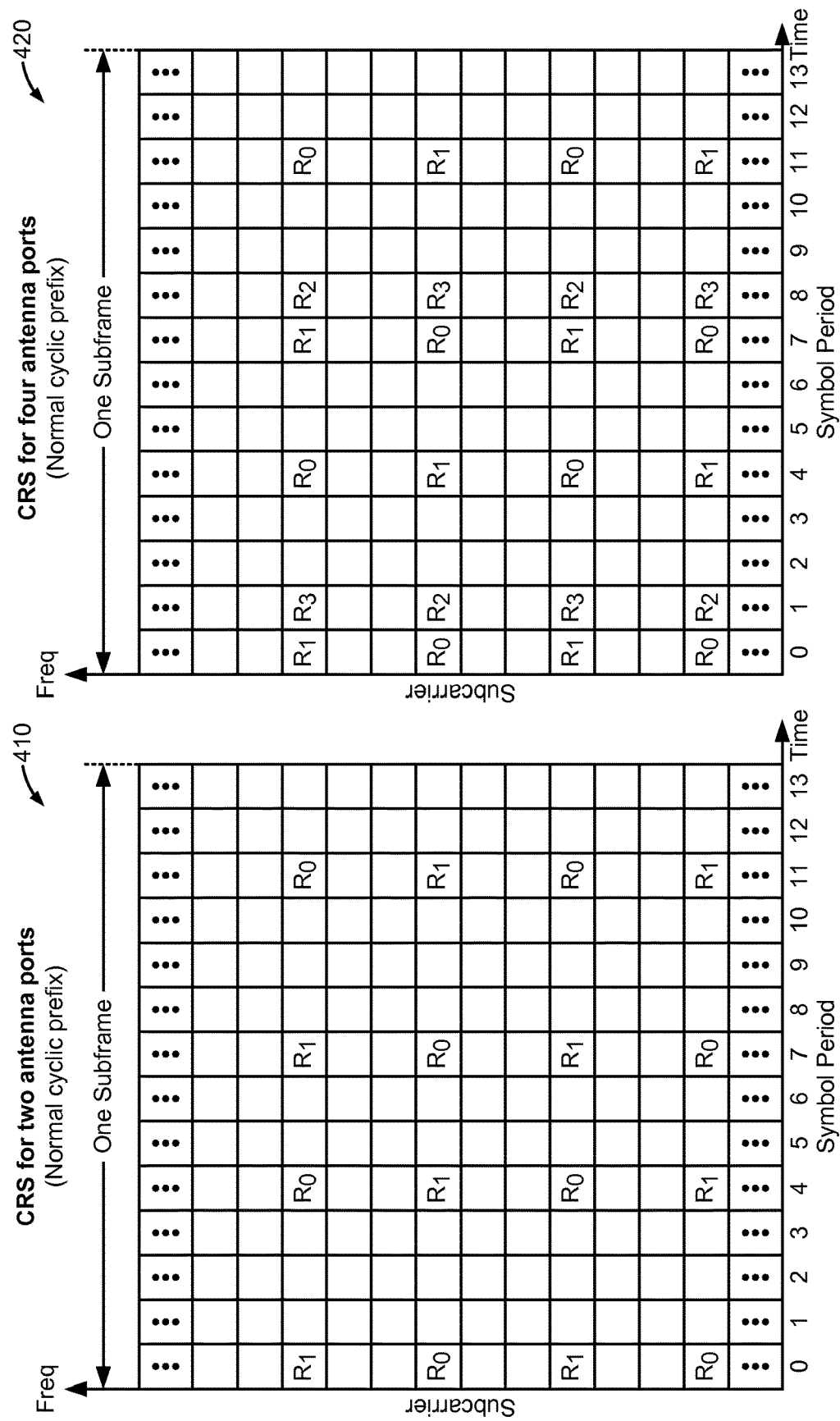
FIG. 4 illustrates example subframe formats for cell-specific reference signal (CRS) transmission, in accordance with certain aspects of the present disclosure.

FIG. 4 shows two subframe formats 410 and 420 for the CRS with the normal cyclic prefix in LTE, according to aspects of the present disclosure. Subframe format 410 may be used for a cell having two antenna ports. The cell may transmit a CRS in symbol periods 0, 4, 7 and 11. Subframe format 420 may be used by a cell having four antenna ports. The cell may transmit a CRS in symbol periods 0, 1, 4, 7, 8 and 11. For both subframe formats 410 and 420, for a given resource element with label $R_m$, a reference symbol may be transmitted on that resource element from antenna port m, and no modulation symbols may be transmitted on that resource element from other antenna ports. An antenna port may also be referred to as an antenna, an antenna element, etc. A cell may transmit the CRS on evenly spaced subcarriers in each symbol period in which the CRS is transmitted.

Figure 5:
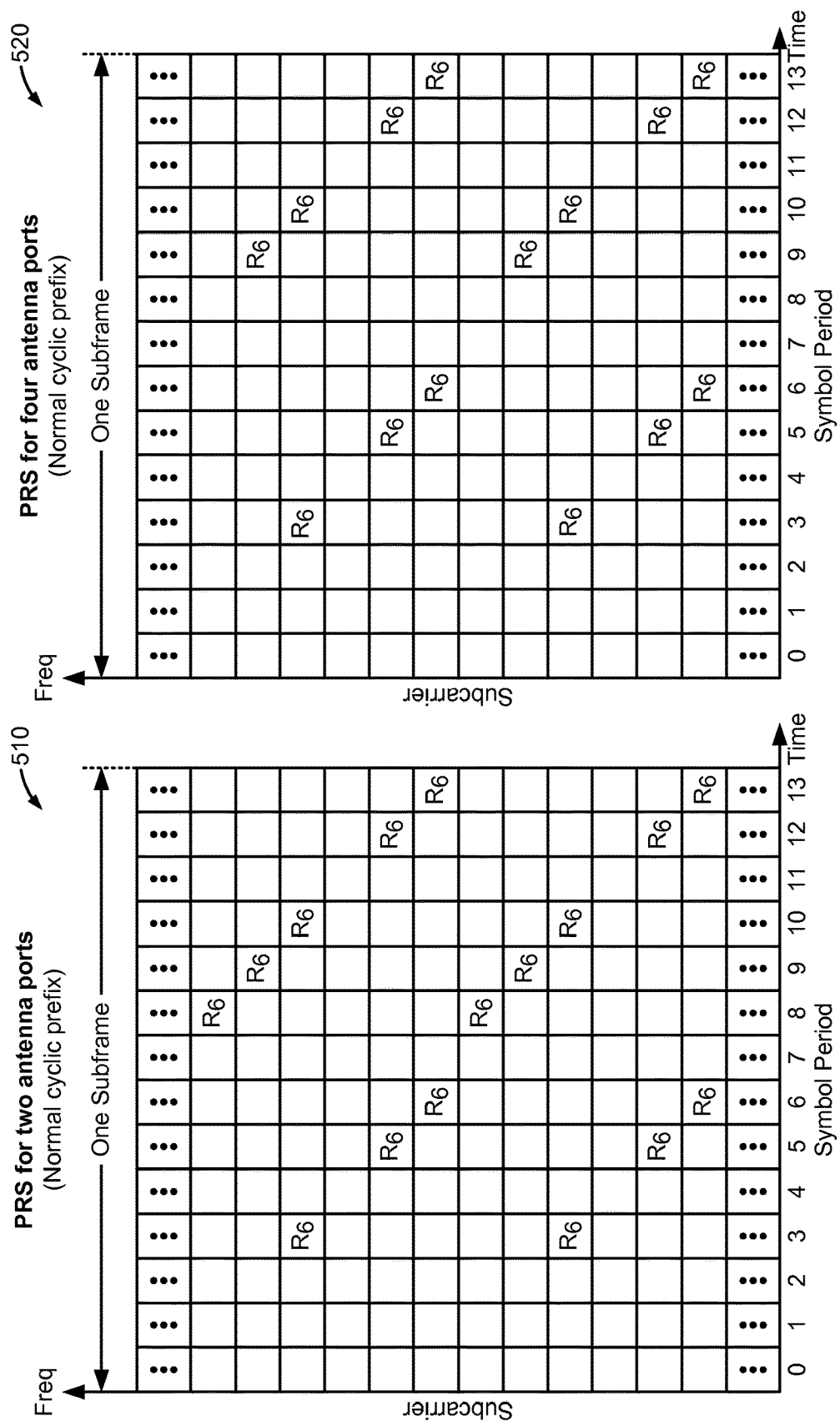
FIGS. 5-5B illustrate example subframe formats for positioning reference signal (PRS) transmission, in accordance with certain aspects of the present disclosure.

FIG. 5 shows two subframe formats 510 and 520 for the PRS for the normal cyclic prefix in LTE, according to aspects of the present disclosure. A subframe may include 14 symbol periods with indices 0 to 13 for the normal cyclic prefix. Subframe format 510 may be used for a cell having one or two antenna ports for a Physical Broadcast Channel (PBCH). Subframe format 520 may be used for a cell having four antenna ports for the PBCH. For both subframe formats 510 and 520, a cell may transmit the PRS on antenna port 6 on each resource element with label $R_6$ in FIG. 5.

Figure 5A:
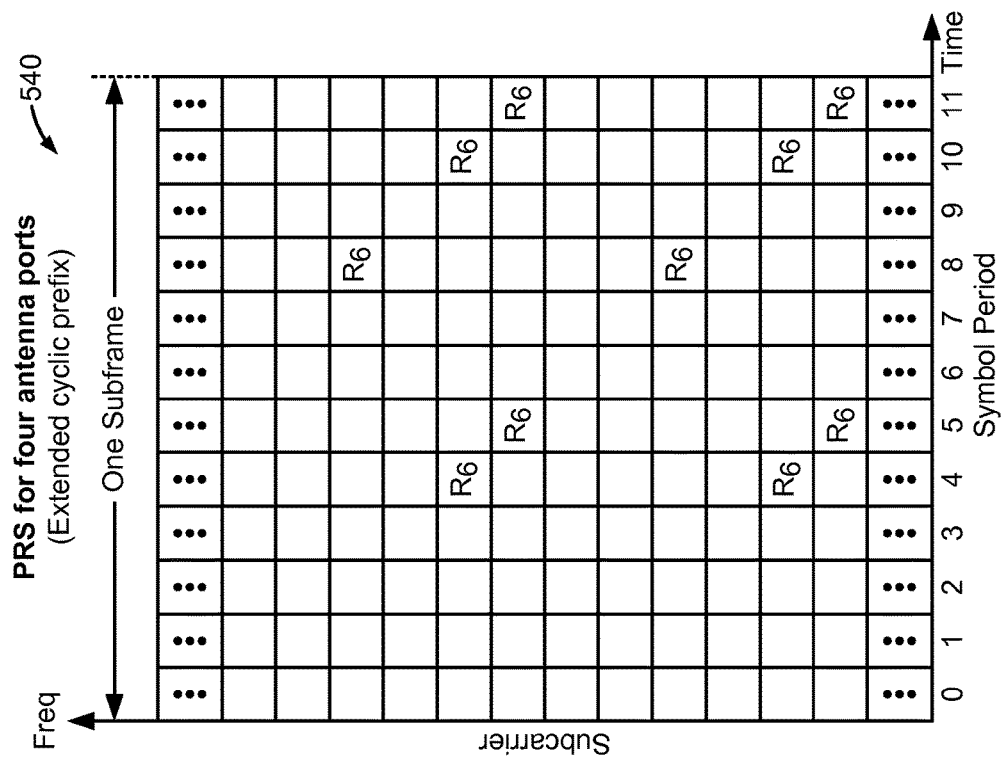
Figure 5A:
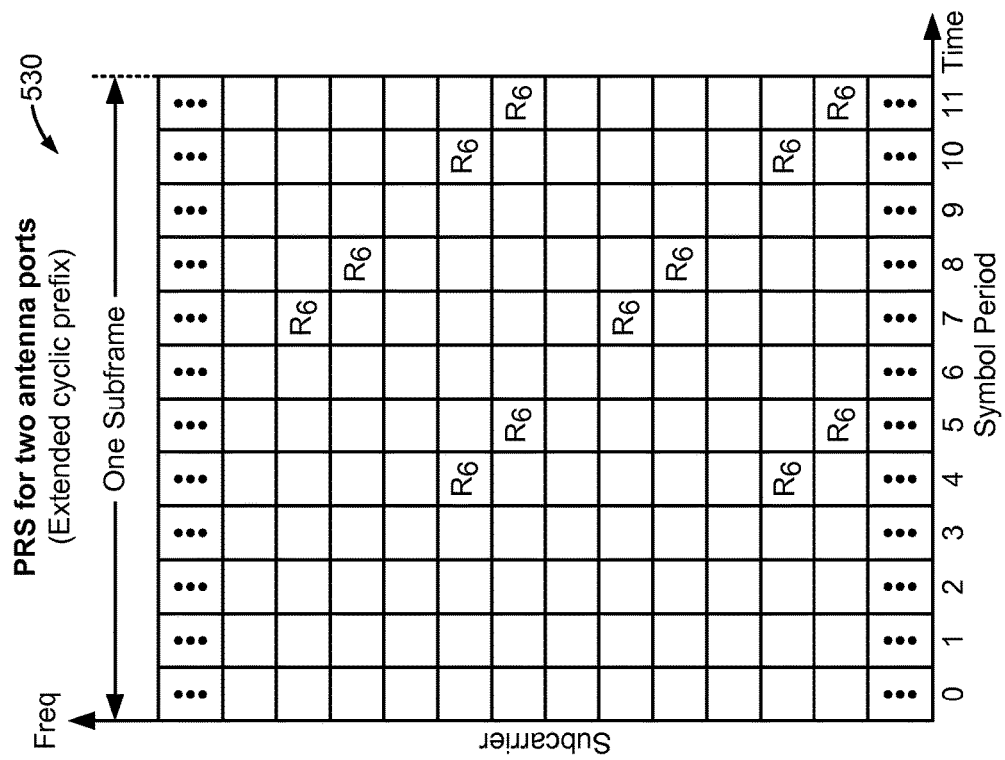

FIG. 5A shows two subframe formats 530 and 540 for the PRS for the extended cyclic prefix in LTE, according to aspects of the present disclosure. A subframe may include 12 symbol periods with indices 0 to 11 for the extended cyclic prefix. Subframe format 530 may be used for a cell having one or two antenna ports for the PBCH. Subframe format 540 may be used for a cell having four antenna ports for the PBCH. For both subframe formats 530 and 540, a cell may transmit the PRS on antenna port 6 on each resource element with label $R_6$ in FIG. 5A.

A cell may transmit the PRS from antenna port 6 on one or more resource blocks in each subframe configured for PRS transmission. The cell may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. A UE may be able to distinguish the PRS from different cells.

A cell may transmit the PRS over a particular PRS bandwidth, which may be configured by higher layers. The cell may transmit the PRS on subcarriers spaced apart by six subcarriers across the PRS bandwidth, for example, as shown in FIGS. 5 and 5A. The cell may also transmit the PRS based on the parameters such as PRS periodicity $T_{PRS}$, subframe offset $\Delta_{PRS}$, and PRS duration $N_{PRS}$. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity $T_{PRS}$ and the subframe offset $\Delta_{PRS}$ may be conveyed via a PRS configuration index $I_{PRS}$. The PRS configuration index and the PRS duration may be configured independently by higher layers. A set of $N_{PRS}$ consecutive subframes in which the PRS is transmitted may be referred to as a PRS occasion. Each PRS occasion may be enabled or muted, for example, the UE may apply a muting bit to each cell. Cells that may be muted in the next PRS occasion should not be measured.

Example Randomization of PRS Frequency Offsets and Muting Patterns in LTE eOTDOA Techniques and apparatus are provided herein for randomization of positioning reference signal (PRS) frequency offset and muting patterns of a cell. For example, frequency offsets for PRS in a subframe and/or a muting pattern bit sequences may be randomized Randomization of PRS may help improve accuracy of, e.g., enhanced observed time difference of arrival (eOTDOA) estimations.

In long term evolution (LTE), location positioning may be performed through OTDOA estimations. A location positioning server indicates a list of neighbor cells to a user equipment (UE). The UE may measure the time of arrival (TOA) for each cell in the list and may report a time difference of arrival (TDOA) with respect to a reference cell to the network. Given the UE's observed time difference of arrival, the location positioning server in the network may determine the position of the UE. The accuracy of location positioning may improve with a greater number of neighboring cells from which PRS is received. Thus, managing interference may be desirable to improve hearability; the ability of a UE to hear and measure the PRS of neighboring cells.

Figure 5B:
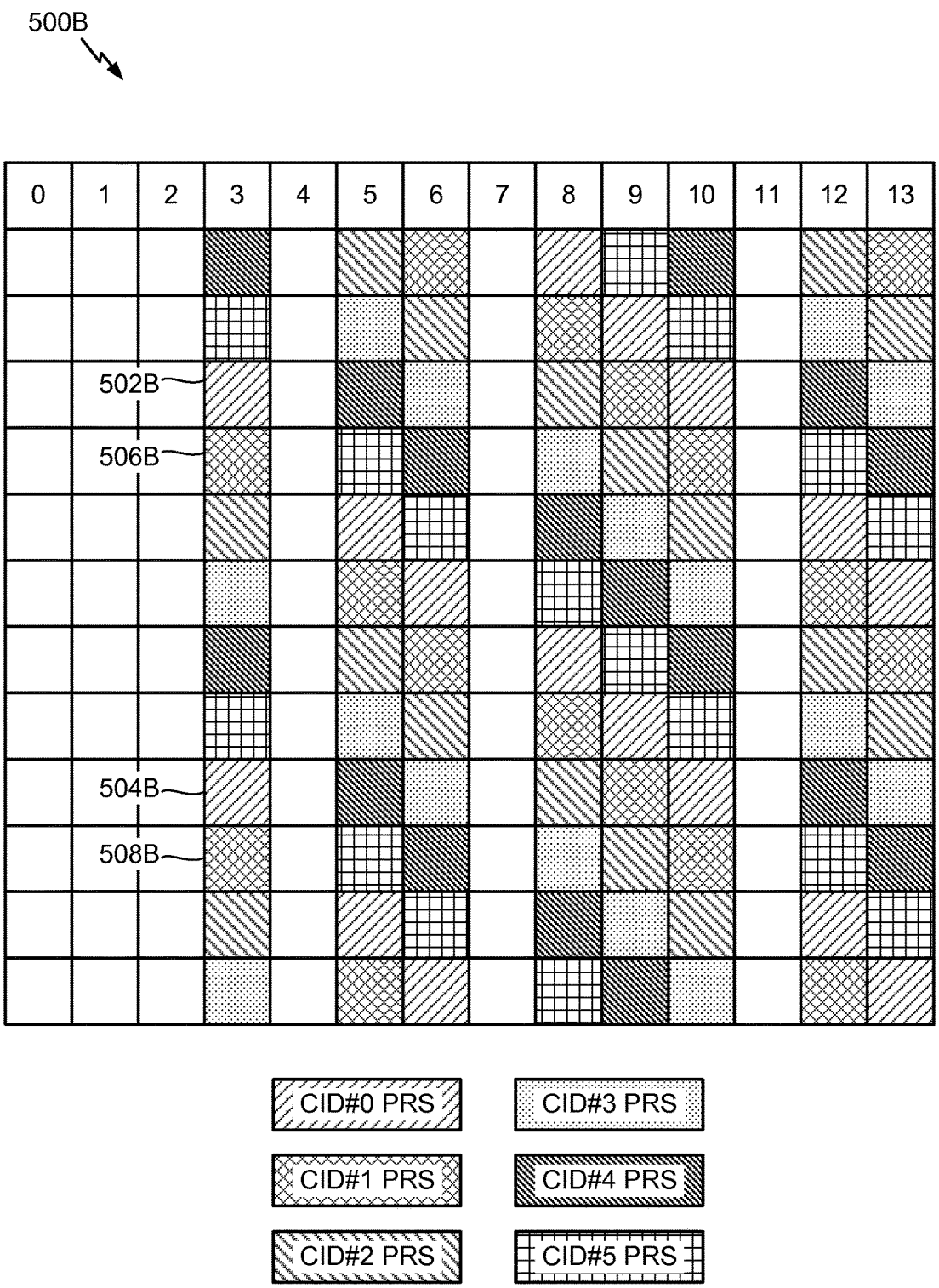

Typically, PRS has a 6-tone stride pattern in every PRS orthogonal frequency division multiplexing (OFDM) symbol (e.g., a symbol that carries PRS) of a PRS subframe (e.g., a subframe that carries PRS). This means that PRS occurs in every 6 tones in the PRS symbol. The offset of the stride (e.g., the first tone in the PRS symbol where PRS occurs) is typically determined based on the physical cell ID (PCID) of the cell transmitting the PRS (e.g., by mod(PCID,6)), where the PCID is in ranges from 0 to 503. FIG. 5B illustrates six possible frequency offsets (e.g., bins) of a PRS subframe 500B in the normal cyclic prefix (CP) case with two transmit antennas. As shown FIG. 5B, a frequency offset of 0 may occur at resource element (RE) 502B in the third symbol period, thus, the PRS may be transmitted in the RE 502B and then again in the RE 504B—with 5 tones between RE 502B and RE 504B. Alternatively, a frequency offset of 1 may occur at RE 506B, thus, the PRS may be transmitted in the RE 506B and then again in the RE 508B—with 5 tones between RE 506B and RE 508B—as so on for offsets of 2, 3, 4, 5, for example. In some cases, two cells may have the same offset (e.g., with same mod(PCID,6)), for example, cells with PCIDs 0 and 6, respectively, may collide in the frequency domain and create interference to each other.

Certain PRS subframes/occasions may be muted—in which the BS may not transmit and/or the UE may not monitor for PRS. Typically, a PRS muting configuration is defined by a periodic PRS muting sequence with periodicity $T_{REP}$, where $T_{REP}$, counted in number of PRS occasions (subframes), can be 2, 4, 8, or 16 which may be represented by a 2, 4, 8, or 16 bit string, respectively, that represents the PRS muting sequence. For a PRS periodicity of 1280 ms, the maximum value of $T_{REP}$ is 8; not 16. If a bit in the PRS muting sequence is set to "0", then the PRS is muted in the corresponding PRS occasion/subframe(s). This PRS muting sequence is configured for each cell in the network. Typically, the sequence length and the exact pattern of a PRS muting sequence can be based on a rather sophisticated algorithm which takes into account the number of neighbor cells in the proximity of the given cell that have the same mod(PCID,6) value.

Typically, both the frequency offset and muting pattern of a cell in the network is static. Because the frequency offset is based on cell PCID (e.g., mod(PCID,6)), frequency offsets of cells may be side-products of network PCID planning. While it is desirable to evenly distribute the neighbor cells of any point in the network among the 6 frequency bins to minimize interference and maximize hearability, this may be difficult to achieve as PCID planning schemes are typically already in place prior to PRS deployment. Therefore, PRS interference management typically does not appear in existing network planning tools. Even if the network planning schemes/tools are updated to account for PRS interference management, this may entail modifying the PCID planning of a live commercial network which may be undesirable. Additionally, to maximize the benefit of Data and CRS Interference Cancellation (IC), it may be desirable that neighboring cells within a cluster all collide in the frequency domain and have the same mod(PCID,6) value—which may conflict with PRS interference management.

PRS muting patterns may address poor PCID planning from PRS perspective by muting PRS transmissions, thereby reducing interference, in the same mod(PCID,6) group. Muting pattern determination may use a sophisticated algorithm/tool that inputs the base station almanac (BSA) of an area and outputs the muting pattern for each cell in that area. A simpler approach may use pseudo-random muting patterns for colliding cells. However, constraints on the possible muting pattern choices (e.g., length limited to 16 bits) may prevent creating sequences that appear as random. Also, the tool/algorithm may periodically be executed in any given area to account for newly added/removed cells and the muting patterns may be updated at both the e Node B (eNB) and the location server. Additionally, once a muting sequence length and pattern is determined for a cell, it is configured in the eNB side. The same information must also reside in the location server for it to be transmitted to UE as part of the assistance data. Thus, signaling overhead may also be involved with the muting sequences.

Furthermore, the constraints for minimizing interference can sometimes be in conflict with other OTDOA metrics such as time-to-fix. For instance, as the number of cells in the same frequency offset of a cluster grows, the number of ON occasions (corresponding to '1' bits in its muting pattern) for each cell in that frequency offset decreases, thereby potentially reducing the opportunities for the UE to measure that cell within a given time window.

Therefore, network PCID planning and conventional muting pattern selection algorithms may be limited in their usefulness for interference management of neighboring cells in a network.

Techniques and apparatus are provided herein for randomization of PRS frequency offsets and muting patterns of a cell in order to minimize interference caused to other neighboring cells transmitting PRS, thereby improving hearability and enhanced OTDOA estimations.

Example PRS Offset Randomization in the Frequency Domain

According to certain aspects, PRS offset may be randomized in the frequency domain in order to reduce interference and improve hearability. For example, the PRS offset factor (e.g., vshift) for a cell may be based on a random number—instead of based on cell PCID (e.g., the mod(PCID,6) value).

A random number generator may generate values uniformly distributed in the range of 0 to 5 frequency tones in an OFDM symbol. Using randomly generated PRS offsets, the PRS offset can hop to a new value in every PRS subframe or occasion; in other words, the PRS offset can be randomly generated each PRS subframe or occasion.

According to certain aspects, the random number generator may be similar to a scrambling code generator and may be initiated with a seed. The UE may have knowledge of the seed, allowing the UE to replicate the same pattern in order to decipher the PRS signal (e.g., monitor the appropriate REs for PRS). The UE may be configured with the seed or may receive the seed from the cell (e.g., via OTDOA assistance data). The random number may be as a function of the cell's PCID, system frame number (SFN), or other parameter. Since the SFN wraps around and repeats itself every 1024 seconds, it may be desirable to make the initial seed a function of longer notions of time (e.g., time of day).

By frequency hopping the PRS offset in different subframes, the PRS offset may no longer be static. For example, in a first subframe (e.g., n−1) from a given cell (e.g., PCID 0), the PRS pattern may be transmitted with any one of the six frequency offset patterns illustrated in FIG. 5B (e.g., corresponding to one of the values zero to five outputted from the random number generator). In a second subframe (e.g., n), the PRS pattern may be transmitted with a different one of the six frequency offset patterns illustrated in FIG. 5B (e.g., corresponding to a different one of the values zero to five outputted from the random number generator) and in a third subframe (e.g., n+1), the PRS pattern may be transmitted with yet another one of the six frequency offset patterns illustrated in FIG. 5B (e.g., corresponding to yet another different one of the values zero to five outputted from the random number generator). For example, in one example scenario, the random number generator may output 4, 0, 1, 3, 5, 0 for six PRS subframes, respectively, covering three PRS occasions, where each PRS occasion has $N_{PRS}=2$ subframes.

Such hopping of PRS tones among different frequency bins may allow improvement in hear-ability since no two cells will always be colliding with each other at all times and the randomness property of the frequency offset allows neighbor cells that were colliding to become orthogonal to each other for a percentage (e.g., $\frac{5}{6}$) of time on average.

Example Muting Pattern Randomization in the Time Domain

According to certain aspects, PRS muting may be randomized in the time domain in order to reduce interference and improve hearability. According to certain aspects, the PRS muting pattern of a cell may be determined by a binary random number generator. The binary (e.g., 0 or 1) random number generated may be initialized with a seed. The seed may be known (e.g., by configuration or by signaling) at both the eNB and UE in order to allow identical replication. This may enable the UE to replicate the muting sequence for PRS occasions of a given cell and schedule PRS measurements accordingly. For example, the UE may not measure for PRS on muted occasions.

According to certain aspects, the random binary sequence for each cell determines the ON/OFF state of PRS transmission in an occasion (and a corresponding measurement at the UE). Since the same seed may be used for the binary random number generator at both the cell and the UE, the muting sequence may not be included in the assistance data sent to the UE for each cell and the muting sequence may also not be included in the location server—since the muting sequence can be generated independently at each side. This may simplify BSA maintenance in the eNB and location server and may reduce the payload size of the assistance information. According to certain aspects, the cell may transmit (e.g., in the OTDOA assistance information) an indication to the UE of whether muting is enabled or disabled (e.g., a Boolean flag).

According to certain aspects, the random number may be generated as a function of the cell's PCID, system frame number (SFN), or other parameter. Since SFN wraps around and repeats itself every 1024 seconds, it may be desirable to make the initial seed a function of longer notions of time (e.g., time of day). Alternatively, length-M Gold Sequences that are common to LTE physical layer and used for scrambling operations may be used.

Conventional muting sequences may have length L (e.g., L=2, 4, 8, or 16), that is repeated. However, according to certain aspects, muting sequences may be designed to have an arbitrarily long period allowing it to approach a real random event with equally likely ON or OFF events. According to an example implementation, a random sequence with a 50% duty cycle (e.g., equal amounts of ON and OFF periods) may improve hearability performance while minimizing the impact on other performance metrics such as time-to-fix, number of cells available for measurement per occasion, and number of cells available for re-measurement. For example, a conventional muting sequence may be 10011010 repeated, whereas using the muting pattern randomization described herein may produce 01100101, 10100110. As mentioned, an advantage is that the muting pattern information may not be transmitted per cell to the UE which would significantly reduce the payload of assistance data, and the location server may not have replicas of muting patterns for each cell in the database.

Figure 6:
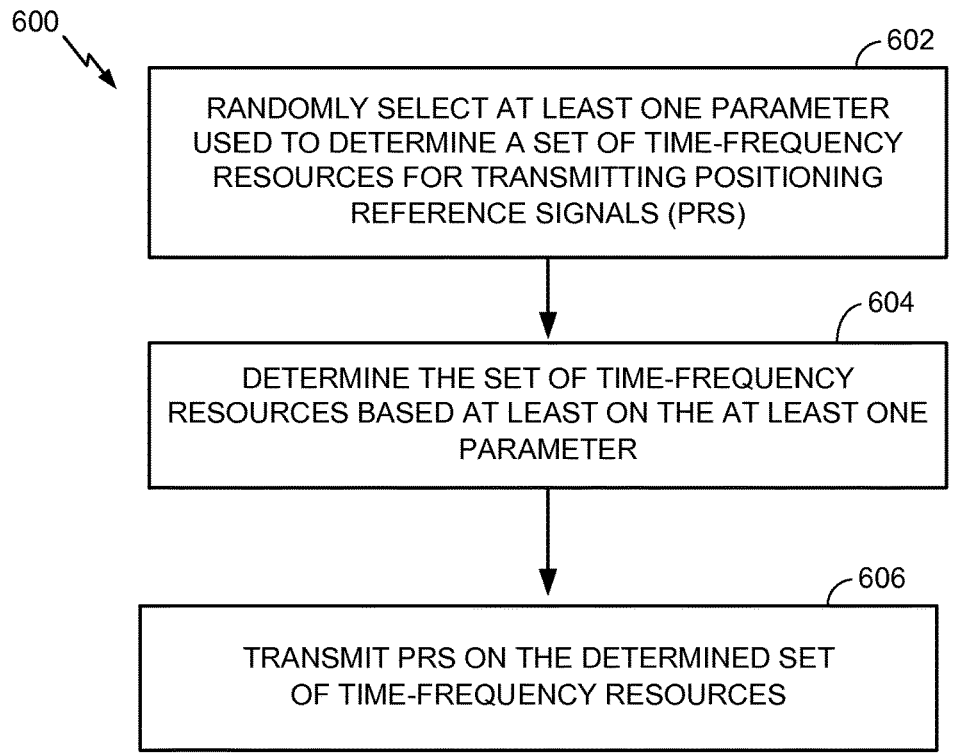
FIG. 6 illustrates example operations performed, for example, by a base station, in accordance with certain aspects of the present disclosure.

FIG. 6 illustrates example operations 600, according to aspects of the present disclosure. Operations 600 may be performed, for example, by a base station (e.g., eNB 110 in FIG. 2). The operations 600 may begin, at 602 by randomly selecting at least one parameter (e.g., a frequency tone offset or a muting sequence) used to determine a set of time-frequency resources for transmitting positioning reference signals (PRS). According to certain aspects, the parameter may be selected using a value generated by a random number generator initialized with a seed value (e.g., based on PCID of the BS, system frame number, or a time of day). The UE may know the seed such that the UE can generate the same value using a random generator of the UE. For example, the BS may provide the seed value to the UE prior to transmitting the PRS. According to certain aspects, the seed value can be provided to the UE with assistance data. The assistance data may include a list of one or more neighboring base stations and observed time difference of arrival (OTDOA) assistance data.

At 604, the BS may determine the set of time-frequency resources based at least on the at least one parameter. At 606, the BS may transmit PRS on the determined set of time-frequency resources. According to certain aspects, the set of time-frequency resources comprises one or more frequency tones in at least one orthogonal frequency division multiplexing (OFDM) symbol of one or more PRS subframes. Frequency tones may be determined based on a stride pattern of a fixed number of tones in each OFDM symbol and the randomly generated PRS offset. The value of the PRS offset may be randomly selected from a set of values corresponding to a size of the stride pattern. Occasions may be determined based on a randomly generated muting pattern having a sequence of bits with each bit indicating whether or not PRS is sent in a corresponding PRS occasion. According to certain aspects, a length of the muting patterns may be selected such that, over a series of PRS occasions, the BS transmits PRS with a duty cycle of a target value (e.g., 50%).

Figure 7:
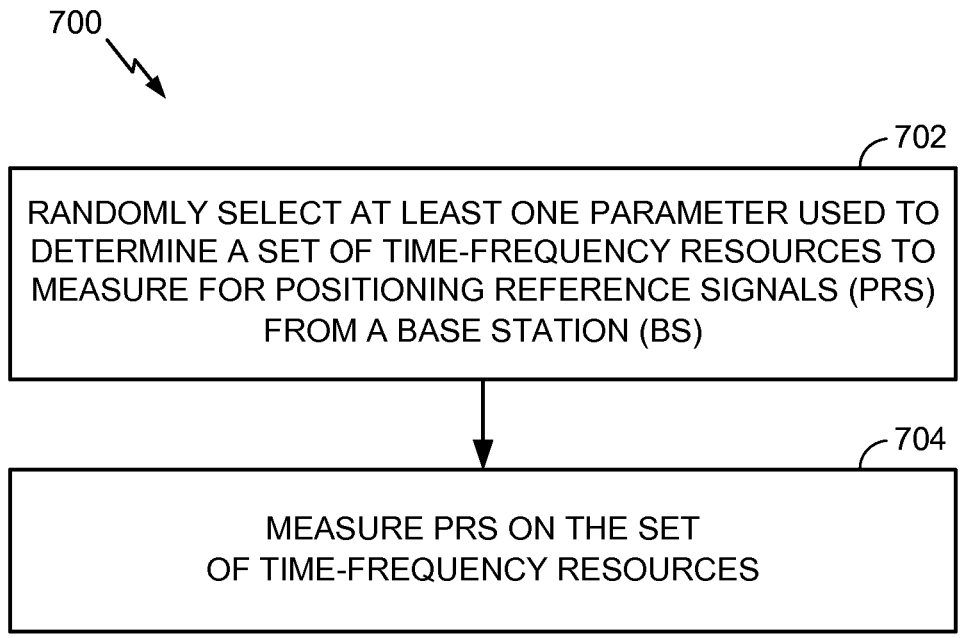
FIG. 7 illustrates example operations performed, for example, by a UE, in accordance with certain aspects of the present disclosure.

FIG. 7 illustrates example operations 700, according to aspects of the present disclosure. Operations 700 may be performed, for example, by a user equipment (e.g., UE 120 in FIG. 2). The operations 700 may begin, at 702 by randomly selecting at least one parameter (e.g., a frequency tone offset or muting pattern) used to determine a set of time-frequency resources to measure for positioning reference signals (PRS) from a base station (BS). According to certain aspects, the parameter may be selected using a value generated by a random number generator initialized with a seed value (e.g., based on PCID of the BS, system frame number, or a time of day). According to certain aspects, the BS may provide the seed value to the UE prior to transmitting the PRS. Alternatively, the UE may be configured with the seed. According to certain aspects, the seed value may be received from the BS with assistance data. The assistance data may include a list of one or more neighboring base stations and observed time difference of arrival (OTDOA) assistance data.

At 704, the UE may measure PRS on the set of time-frequency resources. According to certain aspects, the set of time-frequency resources comprises one or more frequency tones in at least one orthogonal frequency division multiplexing (OFDM) symbol of one or more PRS subframes. Frequency tones may be determined based on a stride pattern of a fixed number of tones in each OFDM symbol and the randomly generated PRS offset. The value of the PRS offset may be randomly selected from a set of values corresponding to a size of the stride pattern. Occasions may be determined based on a randomly generated muting pattern having a sequence of bits with each bit indicating whether or not PRS is sent in a corresponding PRS occasion.

According to certain aspects, the UE may estimate time of arrival (TOA) differences of the measured PRS from PRS from one or more other BSs.

Thus, aspects presented herein provide techniques for randomizing PRS in time, and frequency. This may improve hearability, eliminate or reduce the need for maintenance or planning from network side, and may eliminate or reduce persistent blind spots/clusters (e.g., interference) in the network. If a cell is blocked from detection due to collision in time/frequency (e.g., interference) in one occasion, it is highly unlikely that it will be blocked again in the next occasion or the one after it due to the randomization in time and frequency.

Backwards Compatibility

Figure 8:
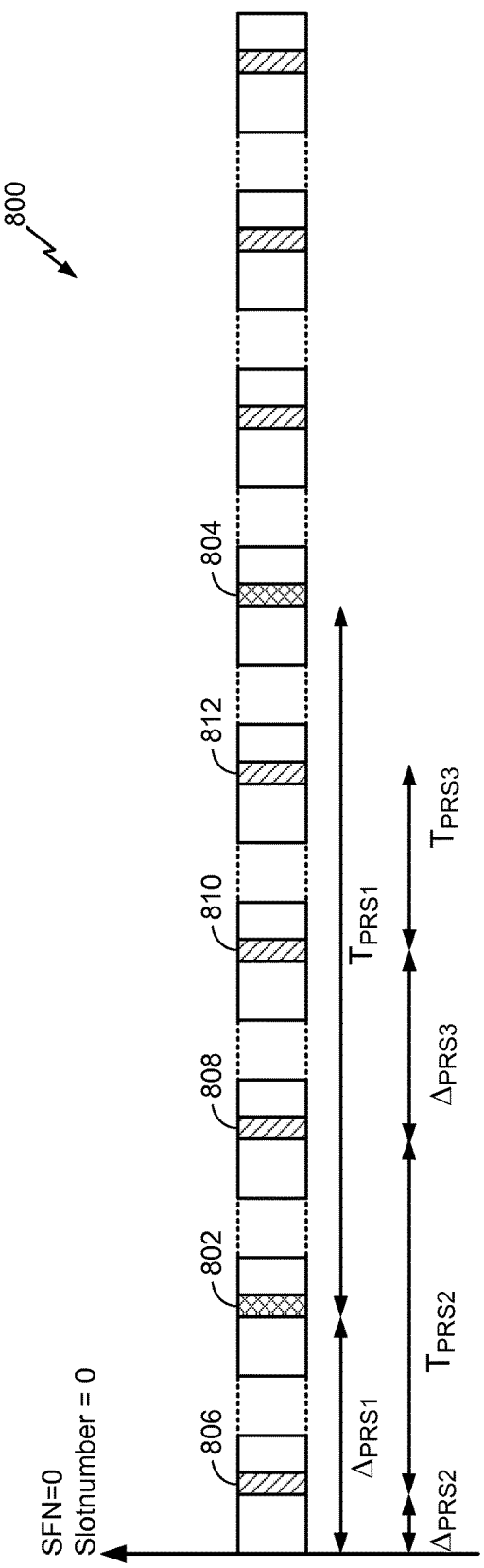
FIG. 8 illustrates an example PRS transmission schedule 800, in accordance with certain aspects of the present disclosure.

If the PRS frequency offset is changed dynamically in each cell, legacy UEs may not be able to measure PRS. According to certain aspects, dynamic and legacy PRS signaling may be interleaved and assistance data may be adapted, in order to allow both legacy and non-legacy UEs to measure PRS. FIG. 8 illustrates an example PRS transmission schedule 800, in accordance with certain aspects of the present disclosure. The PRS transmission schedule 800, for example $T_{PRS}$ and $\Delta_{PRS}$ may be determined by the $I_{PRS}$. As shown in FIG. 8, legacy PRS may be configured according to a legacy configuration and transmitted at an offset according to the $\Delta_{PRS1}$ in subframe 802 and then again in subframe 804 according to the $T_{PRS1}$. The legacy pattern may be static and repeated. Non-legacy PRS may be randomized as discussed herein. For example, PRS may be transmitted at an offset according to the $\Delta_{PRS2}$ in subframe 806 and then again in subframe 808 according to the $T_{PRS2}$. However, each subframe or occasion, for example, a new random configuration may be used for the PRS. For example, PRS may then be transmitted in subframe 810 according to the $\Delta_{PRS3}$ and then again in subframe 812 according to the $T_{PRS3}$. Assistance data with the $I_{PRS}$ indicating the configuration for the legacy PRS may be transmitted to legacy UEs in OTDOA assistance data, while a different $I_{PRS}$ indicating the random PRS configurations may be sent in OTDOA assistance data only to UEs with the corresponding capability. The number of PRS occasions configured by the $I_{PRS}$ may be configurable (e.g., by the network).

In another implementation, a subset of cells may be configured according to legacy PRS transmissions, while another subset of cells may be configured according to the random dynamic PRS configurations. This may allow legacy UEs in at least some cells operate with legacy PRS configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members and duplicates of the same member. As an example, "at least one of: a, b, or c" is intended to cover: a, b, c, a-b, a-c, b-c, a-b-c, aa, bbb-c, aaa-bb-cccc, and etc. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The various operations or methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter (e.g., the transceiver front end 254a through 254r of the user terminal 120 depicted in FIG. 2 or the transceiver front end 232a through 232t of the access point 110 shown in FIG. 2) and/or an antenna (e.g., the antennas 252a through 252r of the user terminal 120 shown in FIG. 2 or the antennas 232a through 232t of the access point 110 shown in FIG. 2). Means for receiving may comprise a receiver (e.g., the transceiver front end 254a through 254r of the user terminal 120 depicted in FIG. 2 or the transceiver front end 232a through 234t of the access point 110 shown in FIG. 2) and/or an antenna (e.g., the antennas 252a through 252r of the user terminal 120 shown in FIG. 2 or the antennas 232a through 232t of the access point 110 shown in FIG. 2). Means for processing, means for determining, means for randomly selecting, means for measuring, means for estimating may comprise a processing system (e.g., TX MIMO Processor 230, Schedule 246, Receive Processor 238, Controller/Processor 240, Transmit Processor 220, or combinations thereof, of the access point 110 shown in FIG. 2 or TX MIMO Processor 266, Transmit Processor 264, Controller/Processor 280, Receive Processor 258, or combinations thereof, of the user terminal 120 shown in FIG. 2).

Figure 6A:
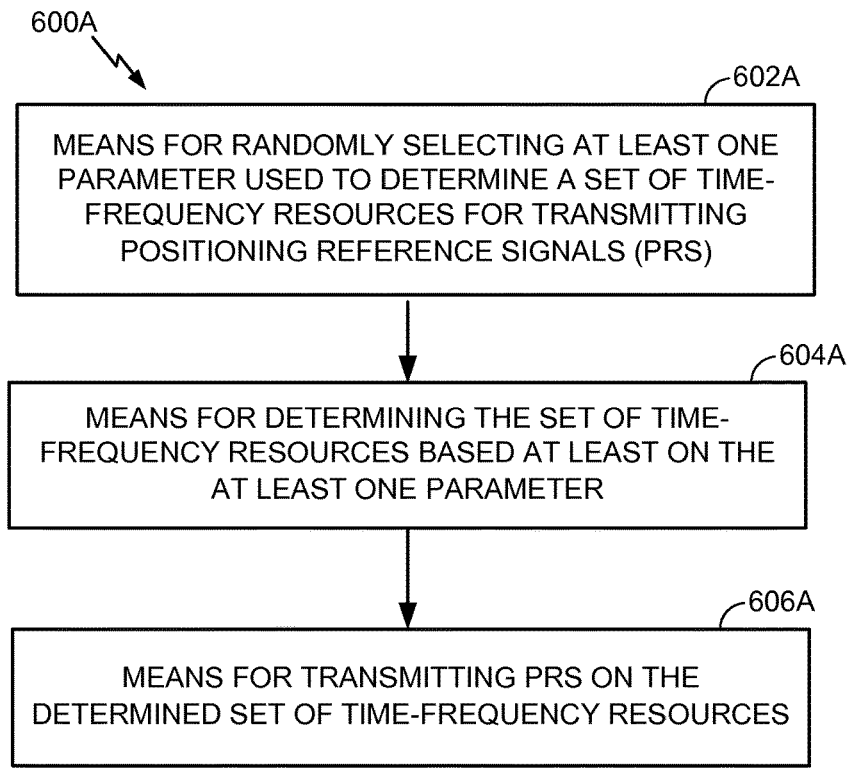
FIG. 6A illustrates example components capable of performing the operations shown in FIG. 6, in accordance with certain aspects of the present disclosure.
Figure 7A:
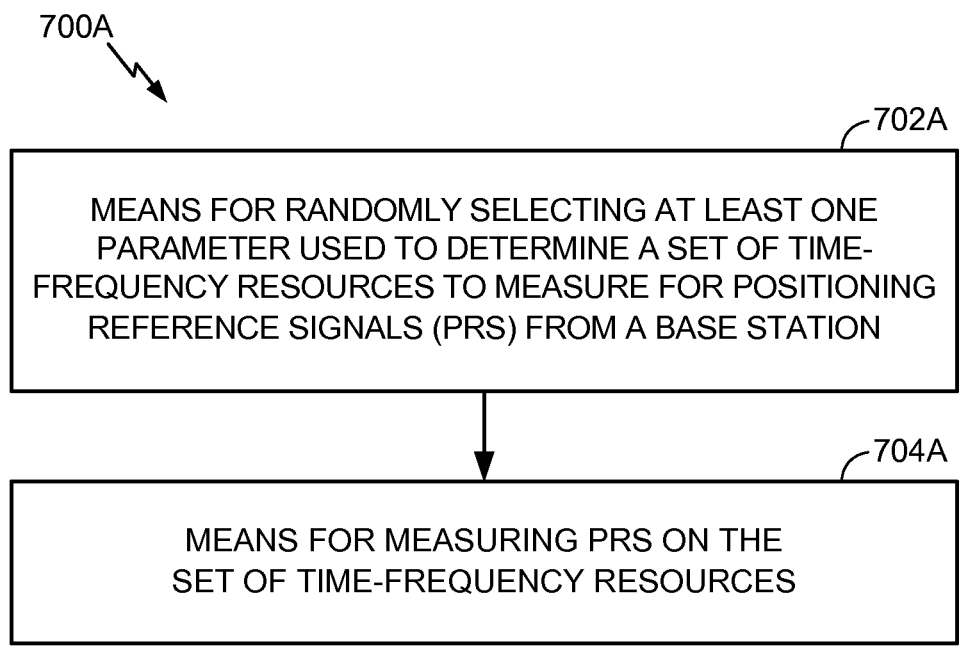
FIG. 7A illustrates example components capable of performing the operations shown in FIG. 7, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 and operations 700 illustrated in FIG. 6 and FIG. 7, respectively, correspond to means 600A and means 700A illustrated in FIG. 6A and FIG. 7A, respectively.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display (e.g., touch screen), mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise.

According to certain aspects, such means may be implemented by processing systems configured to perform the corresponding functions by implementing various algorithms (e.g., in hardware or by executing software instructions).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, phase change memory (PCM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may be executed by a processor or processing system of the user terminal 120 or access point 110 and stored in a memory 282 of the user terminal 120 or memory 242 of the access point 110. For certain aspects, the computer program product may include packaging material.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a base station (BS), comprising:
dynamically selecting a random muting pattern and a random positioning reference signal (PRS) offset, the random muting pattern having a sequence of bits with each bit indicating whether PRS are sent in a corresponding PRS occasion, wherein the random muting pattern and the random PRS offset are randomly selected using a value generated by a random number generator initialized with a seed value that is based on a time of day;
determining a set of time-frequency resources for transmitting PRS based at least on the random muting pattern and the random PRS offset;
transmitting first PRSs on the determined set of time-frequency resources to a first set of user equipments (UEs); and
transmitting second PRSs to a second set of UEs, the second PRSs transmitted according to a static PRS offset computed based on a physical cell identifier (PCID) of the BS and a static muting pattern associated with a defined periodicity, wherein the second PRSs are interleaved with the first PRSs.

2. The method of claim 1, further comprising providing the seed value to the first set of UEs prior to transmitting the first PRSs.

3. The method of claim 2, wherein the seed value is provided to the first set of UEs with assistance data, the assistance data comprising a list of one or more neighboring BSs and observed time difference of arrival (OTDOA) assistance data.

4. The method of claim 1, wherein the set of time-frequency resources comprises one or more frequency tones in at least one orthogonal frequency division multiplexing (OFDM) symbol period of one or more PRS subframes.

5. The method of claim 1, wherein:
the random PRS offset indicates a starting frequency tone within a symbol for transmitting PRS; and
frequency tones are determined based on a stride pattern of a fixed number of frequency tones in each symbol and the random PRS offset.

6. The method of claim 1, wherein a length of the random muting pattern is selected such that, over a series of PRS subframes, the BS transmits PRS with a duty cycle of a target value.

7. The method of claim 1, wherein dynamically selecting the random muting pattern and the random PRS offset comprises selecting at least one of: a different random muting pattern or a different PRS offset per subframe or per PRS occasion.

8. A method for wireless communications by a user equipment (UE), comprising:
randomly selecting a muting pattern and a positioning reference signal (PRS) offset, wherein:
the muting pattern comprises a sequence of bits with each bit indicating whether PRS are sent in a corresponding PRS occasion; and
the muting pattern and the PRS offset are randomly selected using a value generated by a random number generator initialized with a seed value;
determining a set of time-frequency resources for measuring PRS based at least on the muting pattern and the PRS offset; and
measuring the PRS on the set of time-frequency resources.

9. The method of claim 8, further comprising receiving the seed value from a base station (BS) prior to receiving the PRS.

10. The method of claim 9, wherein the seed value is received with assistance data, the assistance data comprising a list of one or more neighboring BSs and observed time difference of arrival (OTDOA) assistance data.

11. The method of claim 8, wherein the set of time-frequency resources comprises one or more frequency tones in at least one orthogonal frequency division multiplexing (OFDM) symbol period of one or more PRS subframes.

12. The method of claim 8, wherein:
the PRS offset indicates a starting frequency tone within a symbol for transmitting PRS; and
frequency tones are determined based on a stride pattern of a fixed number of frequency tones in each symbol and the PRS offset.

13. The method of claim 8, further comprising:
estimating time of arrival (TOA) differences of the measured PRS from PRS from one or more other base station (BSs).

14. The method of claim 8, wherein the set of time-frequency resources to measure for PRS comprises different time-frequency resources per subframe or per PRS occasion.

15. An apparatus for wireless communications, comprising:
means for dynamically selecting a random muting pattern and a random positioning reference signal (PRS) offset, the muting pattern having a sequence of bits with each bit indicating whether PRS are sent in a corresponding PRS occasion, wherein the random muting pattern and the random PRS offset are randomly selected using a value generated by a random number generator initialized with a seed value that is based on a time of day;
means for determining a set of time-frequency resources for transmitting PRS based at least on the random muting pattern and the random PRS offset;
means for transmitting first PRSs on the determined set of time-frequency resources to a first set of user equipments (UEs); and
means for transmitting second PRSs to a second set of UEs, the second PRSs transmitted according to a static PRS offset computed based on a physical cell identifier (PCID) of the BS and a static muting pattern associated with a defined periodicity, wherein the second PRSs are interleaved with the first PRSs.

16. The apparatus of claim 15, wherein:
the random PRS offset indicates a starting frequency tone within a symbol for transmitting PRS; and
frequency tones are determined based on a stride pattern of a fixed number of frequency tones in each symbol and the random PRS offset.

17. An apparatus for wireless communications, comprising:
- means for randomly selecting a muting pattern and a positioning reference signal (PRS) offset, wherein:
  - the muting pattern comprises a sequence of bits with each bit indicating whether PRS are sent in a corresponding PRS occasion; and
  - the muting pattern and the random PRS offset are randomly selected using a value generated by a random number generator initialized with a seed value
- means for determining a set of time-frequency resources for measuring PRS based at least on the muting pattern and the PRS offset; and
- means for measuring the PRS on the set of time-frequency resources.

18. The apparatus of claim 17, wherein:
the PRS offset indicates a starting frequency tone within a symbol for transmitting PRS; and
frequency tones are determined based on a stride pattern of a fixed number of frequency tones in each symbol and the PRS offset.

\* \* \* \* \*